(12) United States Patent
Pham

(10) Patent No.: US 9,056,575 B2
(45) Date of Patent: Jun. 16, 2015

(54) RECREATION VEHICLES WITH NESTING EXPANSION CHAMBERS

(71) Applicant: Tuan Anh Pham, Huntington Beach, CA (US)

(72) Inventor: Tuan Anh Pham, Huntington Beach, CA (US)

(*) Notice: Subject to any disclaimer, the term of this patent is extended or adjusted under 35 U.S.C. 154(b) by 0 days.

(21) Appl. No.: 14/052,701

(22) Filed: Oct. 12, 2013

(65) Prior Publication Data

US 2015/0102632 A1    Apr. 16, 2015

(51) Int. Cl.
*B60P 3/00* (2006.01)
*B60P 3/34* (2006.01)

(52) U.S. Cl.
CPC .......................... *B60P 3/34* (2013.01)

(58) Field of Classification Search
CPC ......................................................... B60P 3/34
USPC ......... 296/165, 166, 171, 172, 173, 175, 176, 296/26.12, 26.13, 26.14
See application file for complete search history.

(56) References Cited

U.S. PATENT DOCUMENTS

| 6,772,563 | B2 * | 8/2004 | Kuhn ................................ 52/67 |
| 7,794,001 | B2 * | 9/2010 | Blackwell et al. .......... 296/24.38 |
| 2005/0189785 | A1 * | 9/2005 | Harder ........................... 296/171 |
| 2012/0068491 | A1 * | 3/2012 | Chase et al. ............... 296/26.13 |

* cited by examiner

*Primary Examiner* — Joseph D Pape

(57) ABSTRACT

A recreational vehicle body structure having expandable body defined by two nesting chambers housed within an enclosed rigid body shell with openings on both side walls for the chambers to extend out. One of the chamber is an enclosed box with interior and exterior entry doors. The other chamber is an open box with only exterior entry door. The recreational vehicle body structure may be part of a towable trailer or a motorized recreational vehicle. In the deployed configuration, the chambers are extended laterally and independently, thereby providing additional living space to the recreational vehicle. In the travel configuration, the chambers are retracted with the enclosed box chamber nesting within the larger open box chamber and the outside walls of the chambers are flush with the body shell sidewalls, thereby reducing the body structure to within the maximum allowable exterior dimensions in length, width, and height for highway bound travel.

16 Claims, 8 Drawing Sheets

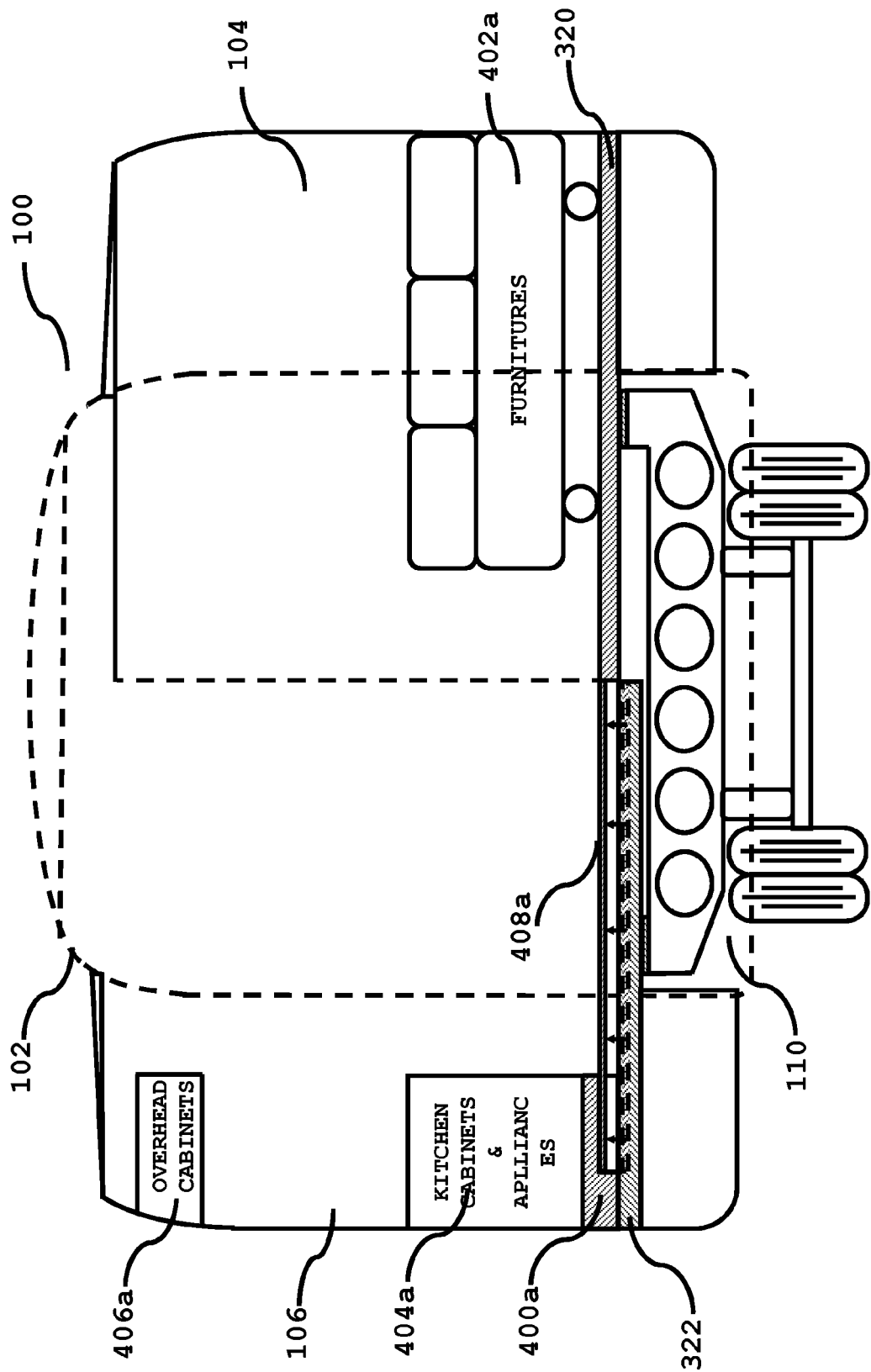

RECREATION VEHICLES WITH NESTING EXPANSION CHAMBERS

BACKGROUND OF THE INVENTION

1. Field of the Invention

The present invention relates to recreational vehicles (RV's), and more particularly, to motor homes and travel trailers that are adapted in size so as to increase the available living space of the vehicle.

2. Discussion of Prior Art

Recreational vehicles are very popular with people who wish to retain comforts and conveniences of their homes while spending extended periods of times away from home at remote locations. In particular, most present motorhomes, fifth wheel trailers and travel trailers, try to retain the same configuration of a conventional home. These vehicles typically include a bedroom, a bathroom with sink and flushing toilet, a kitchen with a refrigerator, stove, sink, and cabinets for storage. There may be a living area with reclining chairs and entertainment center. Altogether, the total amount of living square footage may necessitate a vehicle with an expandable body.

In particular, current regulations dictate that the vehicle must not exceed the maximum allowable exterior dimensions in length, width, and height of highway bound travel. Thus, the manufactures of recreational vehicles have developed numerous systems for extending rooms and bodies of recreational vehicles.

In general, these room extensions operate by allowing additional floor space, when the vehicle is parked, through a slide-out room that extends laterally from the side walls of the vehicle, or from front or back of the vehicle. When the vehicle is in motion, the slide-out is retracted, and secured to the vehicle chassis. In this manner, the recreational vehicle designers have allowed greater living floor space in a vehicle that will remain within the maximum allowable exterior dimensions while in transit on public highways.

In prior art, the applicant is aware of many ways to extend a slide-out laterally from side walls both full-length and half height. An example of vehicle with slide-out rooms extending from the body walls is disclosed by U.S. Pat. No. 6,428,073 to Raymond Willis Blodgett, Jr. Blodgett's patent discloses a vehicle having fixed room and a slide-out room which extends and retracts relative to the fixed room. A slide-out extension mechanism extends and retracts the slide-out in cantilevered manner.

Also in prior art, slide-out can also be extended from the front or rear of the vehicle. An example of rear slide-out extension is disclosed by U.S. Pat. No. 5,658,032 to Stewart Gardner. Gardner's patent discloses a mean to extend the slide-out room rearward by having a stowed chamber moves from within the structure. For use, the stowed structure moves rearward to an expanded position external of the structure. A pair of cantilevered are deployed to support the chamber in the extended position.

Another example of expandable structure is disclosed by U.S. Pat. No. 2008/0164720 A1 to Johnnie R. Crean. Crean's patent discloses an extendable room-in-room slide-out room where a half height slide-out room is extended from the side wall of a full height slide-out room.

In another prior art, the vehicle body expansion can be done vertically with a second floor. An example of multi-level recreational vehicle is disclosed by U.S. Pat. No. 5,967,583 to Randell J. Wishart. Wishart's patent discloses a multi-level recreational vehicle comprises a lower level having floor and a ceiling, wherein the lower level floor has a walking portion providing access to an upper level comprising a deck for recreational or leisure purposes.

Common among the prior art is a vehicle having fixed room and a slide-out room which extends and retracts a portion of the room relative to the fixed room. With this approach, the resulting product is an irregular shape room. Whereas, the slide-out may be a part of a bedroom, a kitchen or a bathroom. In the expanded mode, the slide-out room adds to the living space of the fixed room but may severely limit the use of the room in retracted mode. This is perhaps the biggest complaints against slide-out room design when bed room and bath room facilities are needed at a quick stop-over.

Therefore, what is desired is a method and system that can provide rectangular room shape of a conventional home in the expanded mode and at the same time retain the same shape and access for often needed facilities such as bed room and bath room when in retracted mode.

SUMMARY OF THE INVENTION

In one aspect of the present invention, a vehicle body structure is provided with two chambers which snugly nested into each other's. In one embodiment, one expansion chamber comprises a chamber having a half-width slanted top wall serving as a roof in the expanded position, two spaced sidewalls, an interior partitioning side wall, a bottom floor, and one outside side wall with a door opening; the first said chamber comprises of often used facilities such as bedroom furniture and bathroom toilet, shower stall and lavatories, however, it can be appreciated that the chamber can also comprise of other living areas without departing from the scope of the invention. The second chamber larger in volume, in the second embodiment, comprises an open sided box having a half-width slanted top wall as a roof in the expanded position, two spaced sidewalls, a bottom floor, and one outside side wall with a door opening; this second chamber comprises of additional living space and kitchen facilities. The living space furniture of the second chamber are of foldable types. The kitchen facility equipment of the second chamber are installed in cantilevered manner as to be elevated from the second chamber's floor so that the kitchen equipment will occupy some of the unused space of the first chamber in the retracted position. The first said chamber having smaller interior volume its snugly inside the second said chamber having lamer interior volume allowing either chambers to move laterally from each other between a retracted position and the expanded position.

In another aspect of the invention, first and the second said chambers can be subdivided into two or more rooms. For structure rigidity considerations, one chamber will have two partitioning walls with space in between with sufficient clearance for the other chamber with a single partitioning wall to slide into in the retracted position.

In another aspect of the invention, the present disclosure's vehicle structure consists of an enclosed rigid body shell with openings on both side walls and a carriage assembly having plurality of supporting floor structure members for the installation of the said chambers. The supporting floor structure members consist of supporting members having one side slightly raised to accommodate the floor offset between the first and second said room chambers. The carriage assembly includes plurality of control arms either electrically or hydraulically operated in order to move the said chambers laterally relative to the carriage assembly. In this way, the chambers can be moved laterally independently of each other. The carriage assembly will have longitudinally supporting structure which provide sliding surfaces with V-groove channels for the said room chambers to slide laterally from retracted position to expanded position or vice versa.

This brief summary, rather broadly, has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures:

FIG. 4A is a cross-sectional view of the RV body assembly of FIG. 1 with two slide-out chambers in expanded positions;

DETAILED DESCRIPTION OF THE PREFERRED EMBODIMENTS

The following detailed description is of the best currently contemplated modes of carrying out the invention. The detailed description is not to be taken in a limiting sense, but the detailed description is made merely for the purpose of illustrating the general principles of the invention, since the scope of the invention is best defined by the appended claims.

Figure 1:
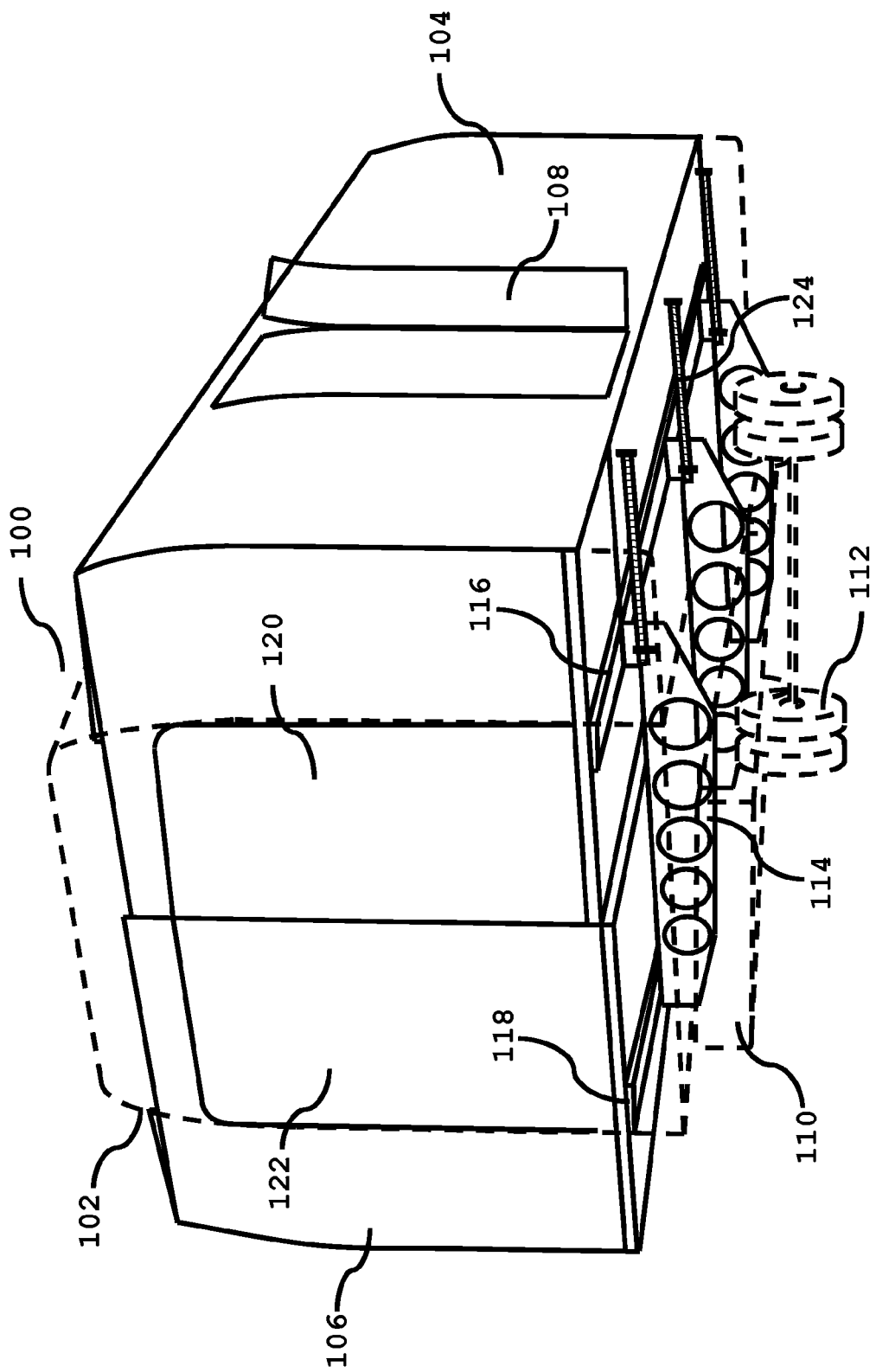
FIG. 1 is a perspective view of a RV body structure comprise of a rigid enclosed body shell and a carriage assembly with wheels and floor structure support, and with two slide-out chambers in deployed positions.

FIG. 1 illustrates one embodiment of a RV's body structure 100 comprising of a rigid body shell 102 and a carriage assembly 110 with two slide-out chambers 104 and 106 in deployed positions. The body structure 100 may be part of a motorized RV or a towable trailers. The carriage assembly 110 attached to a plurality of wheels 112 so as to permit rolling movement of the motorized RV or a towable trailer. FIG. 1 further illustrates a rigid body shell 102 that is mounted above carriage assembly 110 having the main roof, front and rear walls, with openings on the side walls to accommodate two slide-out chambers 104 and 106. The slide-out chambers 104 and 106 are supported by the carriage assembly 110's plurality of supporting floor structure members 114. Furthermore, the slide-out chambers 104 and 106 are coupled to the carriage assembly 110 by plurality of either electrically, or hydraulically, or electro-mechanically operated control arms 124 in order to move the said chambers laterally relative to the supporting carriage assembly 110. In this way, the slide-out chambers 104 and 106 can be extended or retracted independent of each other's. In the preferred embodiment, the exterior wall of slide-out chambers 104 and 106 having at least one entry door 108 (entry door for slide-out chamber 106 is not shown). In another preferred embodiment, for motorized RV, the front wall of slide-out chambers 104 and 106 having at least one cut out opening 120 and 122 respectively to facilitate slide-out access from the front driving cab area. The slide-out chambers 104 and 106 may either be placed in the extended position independently so as to effectively increase the desired living space of RV body structure 100. In the extended position, the slide-out chambers 104 and 106 extend laterally in a telescopically manner. In the retracted position, the slide-out chambers 104 and 106 are telescopically received and nested with each other's. In one embodiment, not intended to be limiting, the slide-out chambers 104 and 106 are also supported by relatively low friction sliding surfaces with V-groove channels 116 and 118.

Figure 2:
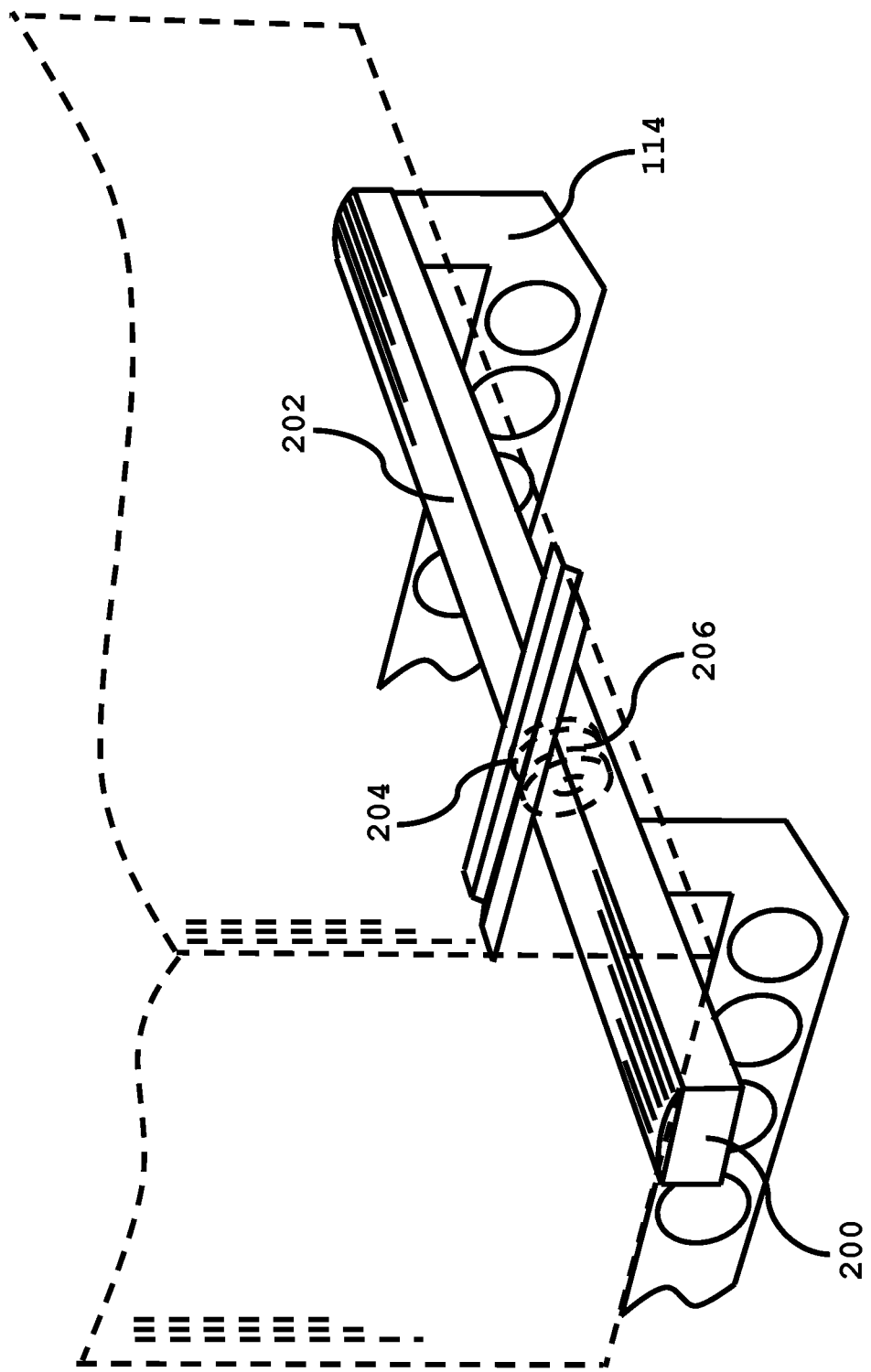
FIG. 2 is an enlarged perspective view of an embodiment of a longitudinally supporting structure which provides low friction sliding surfaces with V-groove channels for the slide-out chambers of the RV body assembly of FIG. 1.

With reference to FIG. 2, not to be taken in a limiting sense, a detailed plan of the low friction sliding surface with V-groove channel guides providing support for the slide-out chambers. In FIG. 2, the low friction support member 200 having a low friction material 202 installed on the top surface where the contact between the support member 200 and the slide-out chamber 104 or 106 of FIG. 1 is made while in extending or retracting operations. The bottom surface of chambers 104 and 106 of FIG. 1 may include V-shape extrusion channels 204. These channels will have mating indented V-groove channels or V-groove caster wheels support 206 on the low friction support member 200. These mating V-groove channel guides will help to provide low friction sliding of slide-out chamber and will also help to prevent the slide-out chambers from extending and retracting in a lopsided manner. It will be appreciated that the low friction surfaces with V-groove channels illustrated herein is simply illustrative of one of a number of possible low friction surface layouts and that a number of variations of these low friction surfaces with channel guides can be made without departing from the spirit of the present invention. The V-groove caster depicted in FIG. 2 is a commercial product readily available for purchase in the U.S market place.

Figure 3:
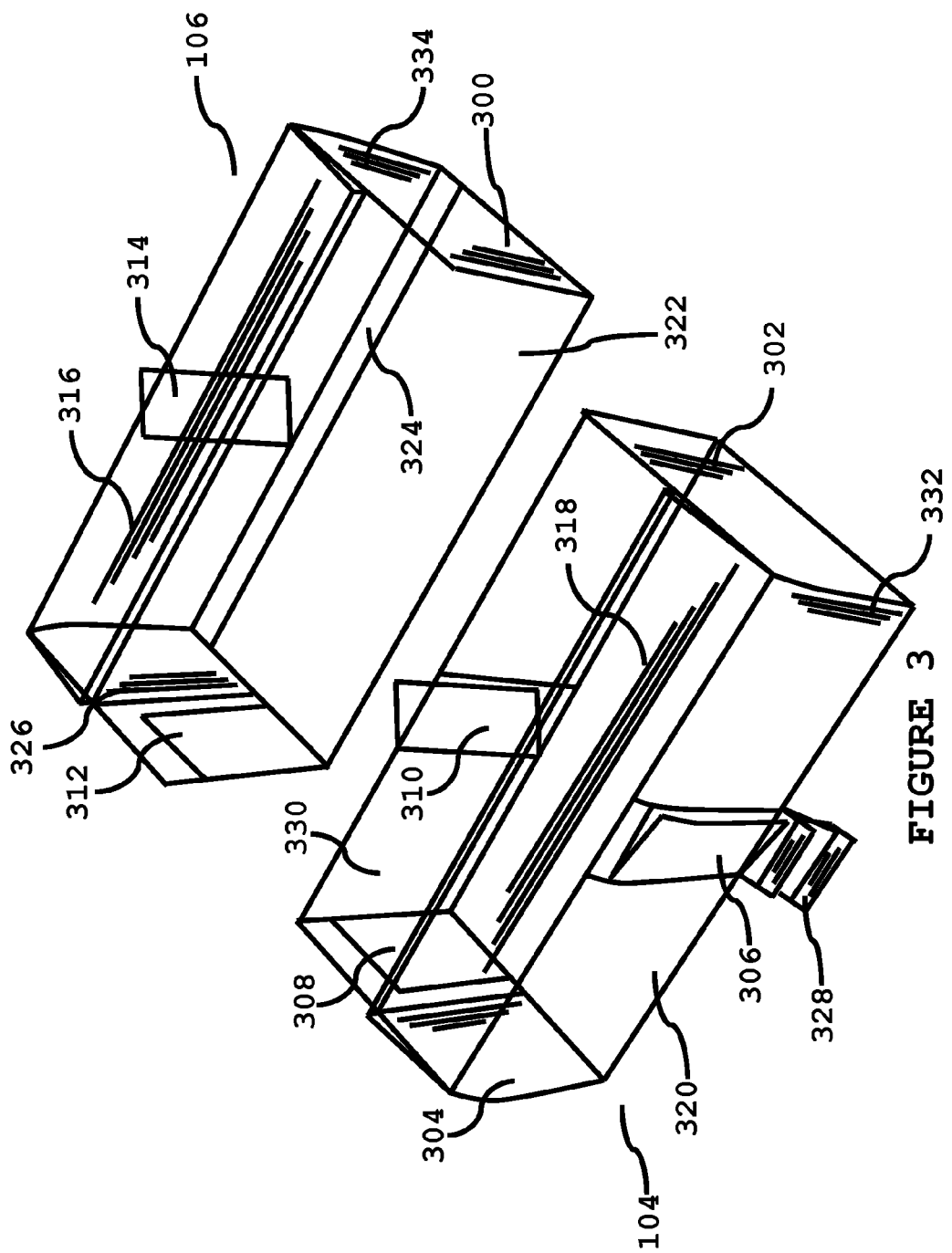
FIG. 3 is a perspective view of the two slide-out chambers with the smaller chamber designed to fit inside a larger chamber.

We now refer to FIG. 3 depicting the two slide-out chambers 104 and 106 of FIG. 1. FIG. 3 depicts the perspective view of each of the slide-out chambers 104 and 106 of FIG. 1 separately. In FIG. 3, the slide-out chamber 104 is a smaller chamber having a half-width slanted roof 318, floor 320, one rear side wall 302, one forward side wall 304, one outside sidewall 332 having at least one entry door 306 and step ladder 328, and at least one inside entry door 310 on a partitioning wall 330. In one embodiment, slide-out chamber 104 may have at least one wall cutout 308 in order to provide access to front driving cab area of a motorized RV. In another embodiment, the slide-out chamber 104 rests on a longitudinally installed low friction sliding surface 116 of FIG. 1. In the extended mode, slide-out chamber 104 will only extend telescopically as much as the half-width slanted roof 318 can still provide cover. It can be appreciated that since the slide-out chamber 104 will only extend about half the width of the slide-out chamber, the remaining half of the chamber 104 will act as counter-weight to the extruded half of the slide-out chamber 104. In the retracted mode, slide-out chamber 104 will retract until the outside sidewall 322 is flush with the sidewall of the RV's body 102 of FIG. 1. The floor 320 of slide-out chamber 104 will glide on top of the floor 322 of slide-out chamber 106 in the retracted position.

As also in FIG. 3, the slide-out chamber 106 is a larger volume chamber having a half-width slanted rigid roof 316, floor 322, one rear side wall 300, one forward side wall 326, and one outside sidewall 334 having at least one entry door 314 with step ladder not shown. In one embodiment, slide-out chamber 106 may have at least one wall cutout 312 in order to provide access to front driving cab area of a motorized RV. In one embodiment, the slide-out chamber 106 rests on a longitudinally installed low friction sliding surface 118 of FIG. 1. In the extended mode, slide-out chamber 106 will only extend telescopically as much as half-width slanted roof 316 can still provide cover. It can be appreciated that since the slide-out chamber 106 will only extend about half the width of the slide-out chamber, the remaining half of the chamber 106 will act as counter-weight to the extruded half of the slide-out chamber 106. In the retracted mode, slide-out chamber 106 will retract until the outside sidewall 334 is flush with the sidewall of the RV's body 102 of FIG. 1. The floor 322 of slide-out chamber 106 will slide underneath of the floor 320 of slide-out chamber 104 in the retracted position.

As illustrated in FIG. 3, it will be appreciated that even when both slide-out chambers 104 and 106 are in fully retracted positions, the slide-out chamber 104 will only occupy most of the floor space of slide-out chamber 106 leaving a space gap 324 which will be used to provide raised floor space to install kitchen appliances in a cantilevered manner or to be used for foldable living room furniture storage.

Figure 4B:
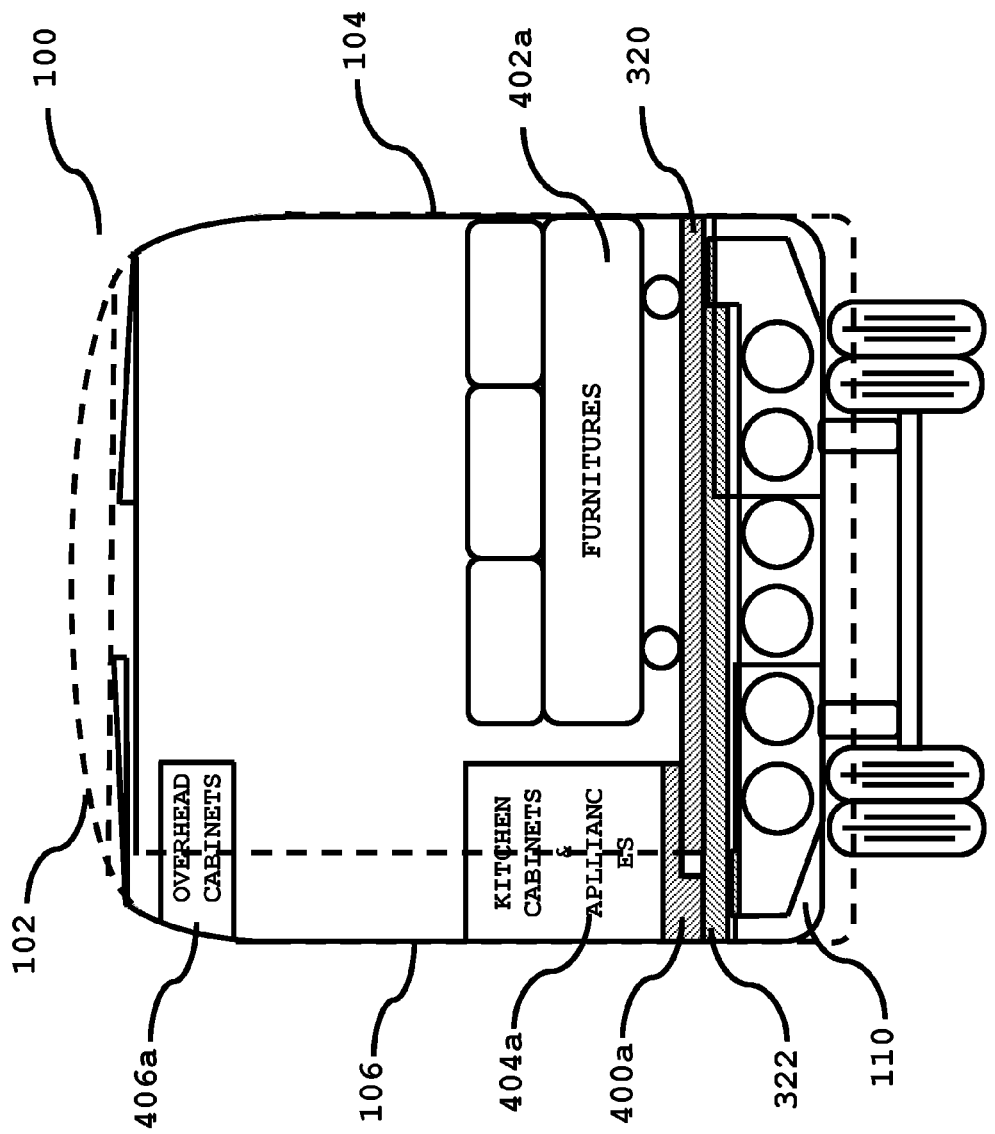
FIG. 4B is a cross-sectional view of the RV body assembly of FIG. 1 with two slide-out chambers in retracted positions.

Reference will now be made to FIGS. 4A and 4B which provide a detailed cross sectional view of a RV's body assembly 100 of FIG. 1 in expanded mode and retracted mode, respectively. In particular, FIG. 4A illustrates the RV body assembly 100 with slide-out chambers 104 and 106 fully extended. As illustrated in FIG. 4A, the raised platform 400*a* is used to install kitchen appliances off the floor so that not to interfere with floor 320 in the fully retracted position as illustrated in FIG. 4B. Moreover, as illustrated in FIG. 4A, the furniture 402*a*, overhead cabinets 406*a*, and kitchen appliances 404*a* are strategically positioned along the outer vertical walls of slide-out chamber 104 and 106 so that they will not interfere with each other as illustrated in FIG. 4B while in fully retracted position. Furthermore, as illustrated in FIG. 4B, when slide-out chamber 104 and 106 are in fully retracted mode, the cantilevered kitchen appliances 404*a* are allowed to occupy unused living space of slide-out chamber 104. As illustrated in FIG. 4A, it can be appreciated that when slide-out chamber 106 is fully extended, the floor member 408*a* can be optionally raised electrically or hydraulically to provide a flat floor throughout the RV.

Figure 5:
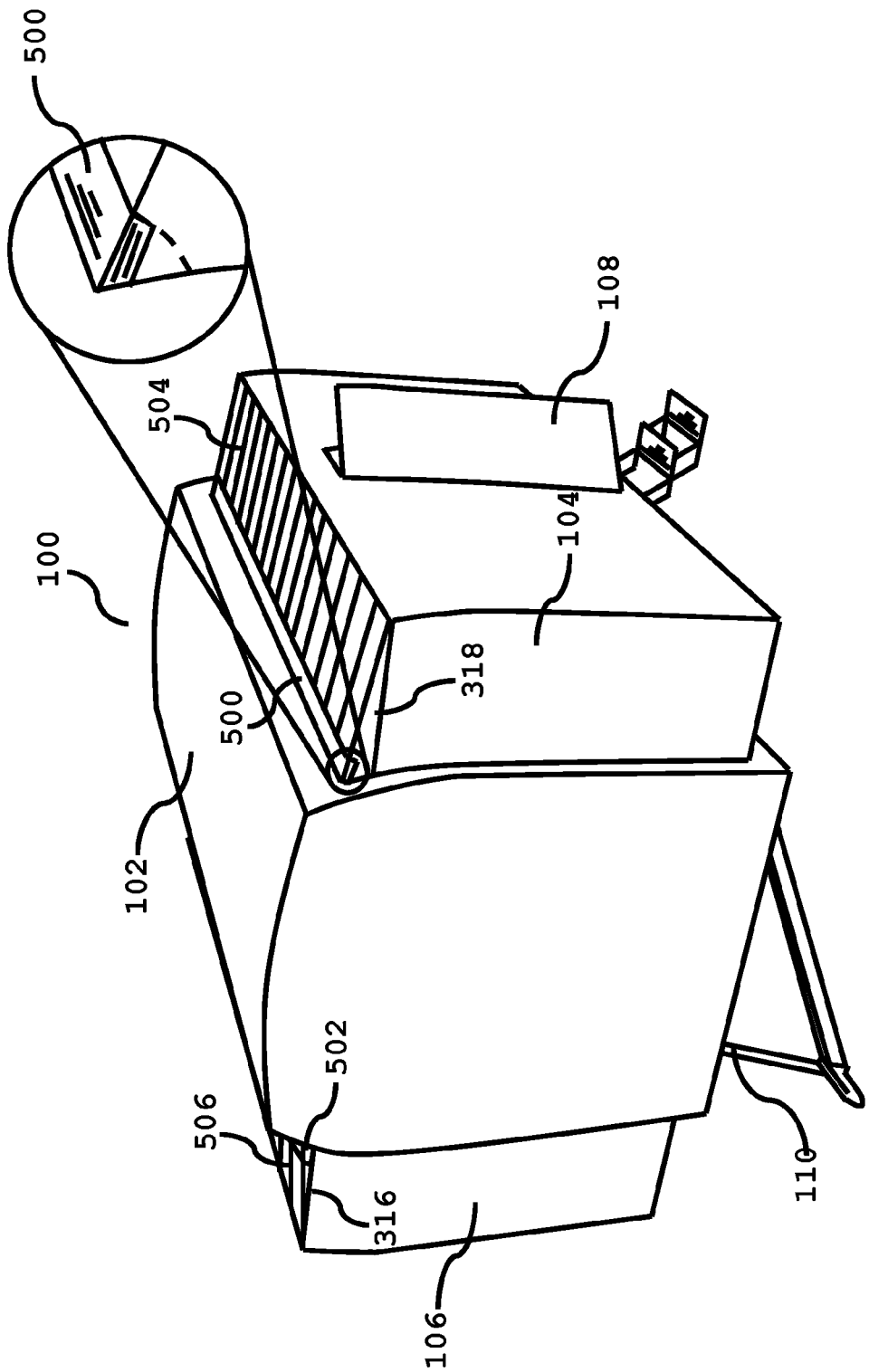
FIG. 5 is a general perspective view of the body chambers of the RV's body assembly of FIG. 1, showing the slide-out chambers' slanted rigid roof details according to an embodiment of the present invention.

We now refer to FIG. 5. FIG. 5 illustrates one aspect of the present invention of a rigid slanted roof design instead of a flat roof requiring roll-able canvas awning to be attached on the outside of the RV body above of the slide-out unit which is typical of slide-out design on today's many RV's. FIG. 5 illustrates a preferred embodiment of the present invention of a trailer RV having body structure 100 and body shell 102 mounted on a carriage assembly 110. The trailer RV body structure has two slide-out chambers 104 and 106 with a half-width rigid slanted roof 318 and 316 respectively. As illustrated in FIG. 5, the roof 316 and 318 are slanting downward having plurality of raised channels 506 and 504, respectively, to facilitate rapid and uniform water run-off properties along the longitudinal edges of the slide-out chambers' roofs 316 and 318. Attached to the body shell 102 above the roof 316 and 318 are spring loaded flaps 502 (mostly hidden from view) and flap 500 respectively. In the extended mode of slide-out chamber 104, the roof 318 will push against the flap 500 causing the flap to rest above the roof as to prevent rain water from blowing into to top spacing between the slide-out chambers' roofs and the RV's top side wall opening. As the slide-out chamber 104 retracts, the spring loaded action of the flap 500 causes the flap 500 to close down as the slide-out room chamber 104 retracts. At the fully retracted mode of slide-out room chamber 104, the flap 500 is fully closed flush with the side wall of RV body 102. Similar actions happen as with slide-out chamber 106, roof 316, and flap 502.

Figure 6:
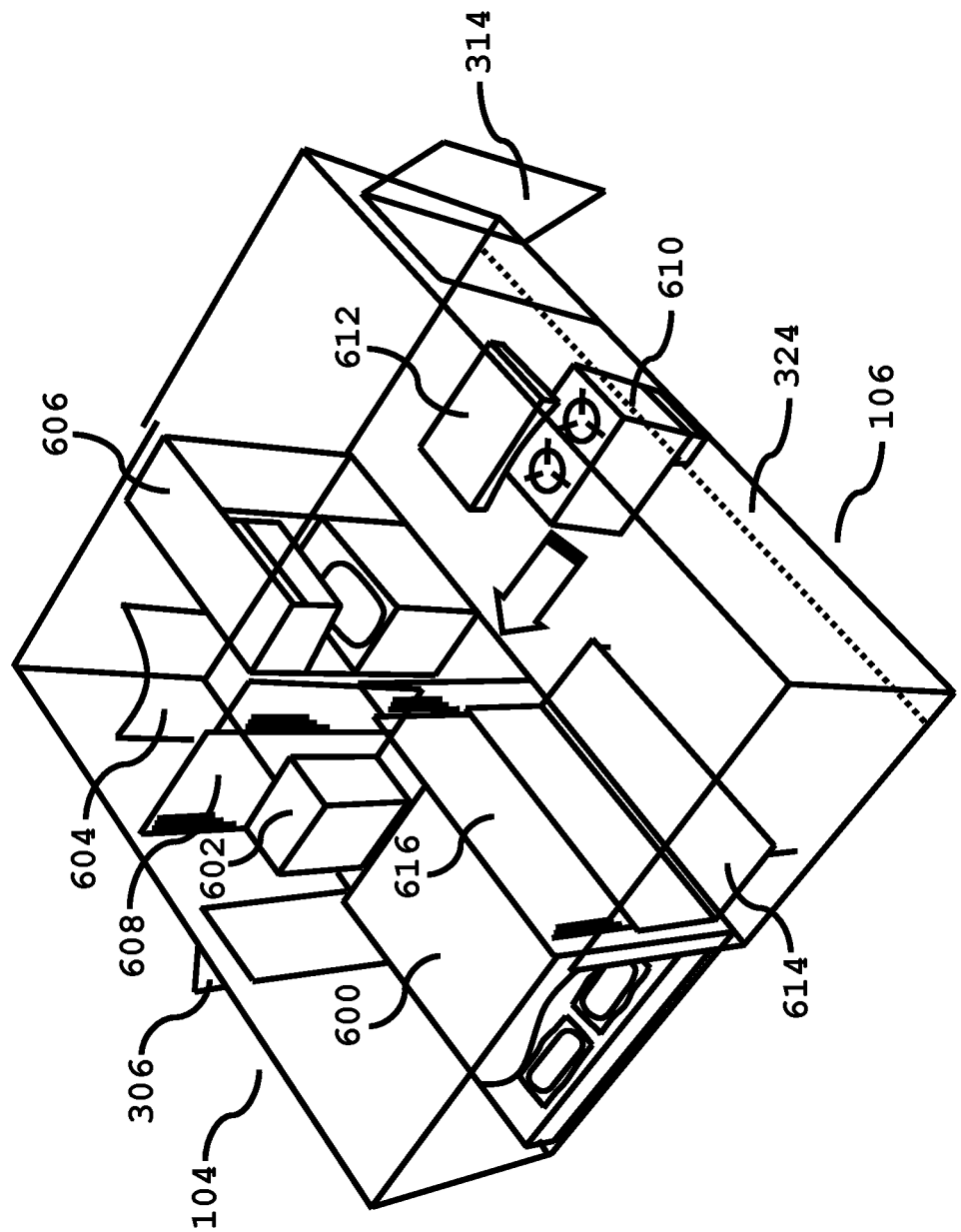
FIG. 6 is a general perspective view of the body chambers interior floor plan of the RV's body assembly of FIG. 1.

With reference to FIG. 6, not to be taken in a limiting sense, a detailed plan of the interior living spaces for slide-out chambers 104 and 106 are provided. As illustrated in FIG. 6, the interior living space of slide-out chamber 104 consists of often needed facilities such as bedroom and bathroom facilities. Slide-out chamber 104 retains its original rectangular shape even in a fully retracted mode. It has bedroom furniture such as bed 600, drawer cabinets 602, and bathroom facilities such as a toilet (not shown), a wash basin (not shown), shower stall 604, etc. . . . . . Slide-out chamber 104 has its own entry door 306 to facilitate entry and exit from the outside, and make use of wall partition 608 with sliding door for personal privacy while the bathroom is being occupied. It will be appreciated that in many instances, it would be highly desirable to have the bedroom and bathroom facilities available for a quick stopover even when the RV is configured for travelling mode.

As is further shown in FIG. 6, the interior living space of slide-out chamber 106 consists of additional living space and a kitchen facility for cooking with cooking appliances 610, installed in cantilevered manner, and range hood 612 installed above. Also illustrated in FIG. 6, slide-out chamber 106 make use of permanently installed folding furniture 614 that can be easily opened for use and be folded in-place prior to retracting slide-out chamber 106. Furthermore, while slide-out chamber 106 is in the extended mode, kitchen furniture 606 consisting of pantry cabinets, kitchen sink and faucet, microwave oven, refrigerator, etc. . . . will be available for use. It will be appreciated that because slide-out chamber 106 can be extended and retracted independently of slide-out chamber 104, slide-out chamber 106 can be extended by itself just enough so that quick access to kitchen appliances such as microwave and refrigerator can be accomplished with ease. When slide-out chamber 106 is in retracted mode, folding furniture 614 will occupy yet remaining open space 324 of slide-out chamber 106. With the door of bedroom wall 616 having a sliding door stowed away (opened), the cantilevered kitchen appliance 610 will occupy the empty space next to kitchen furniture 606.

Figure 7:
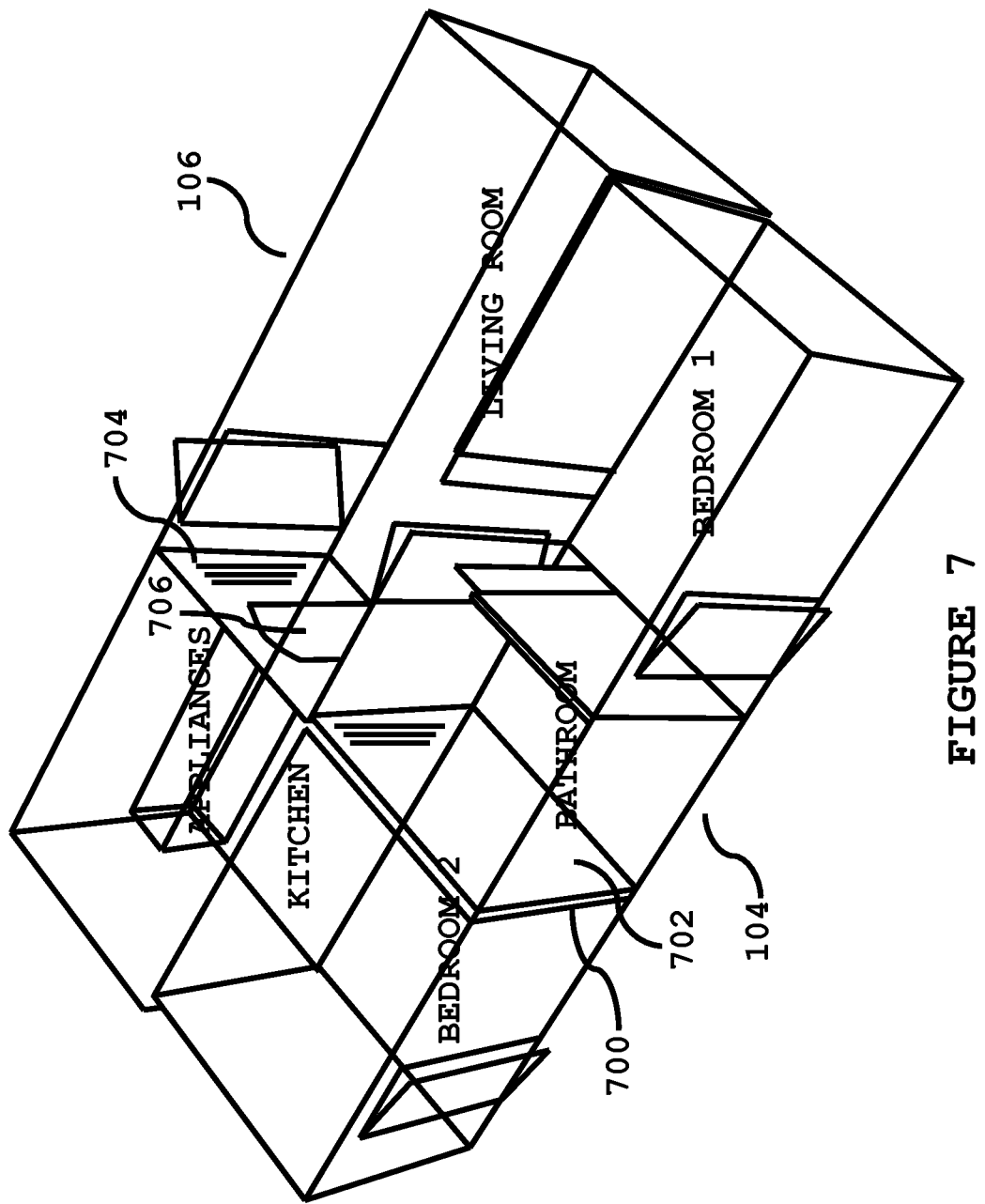
FIG. 7 is a general perspective view of the larger body chambers interior floor plan of the RV's body assembly of FIG. 1 having subdivided into two or more rooms; having two partitioning walls with space in between in one chamber, having sufficient clearance the other chamber with a single partitioning wall, to slide into in the retracted position for structure rigidity re-enforcement, according to an embodiment of the present invention.

In yet another embodiment of the present invention, FIG. 7 illustrates a much larger RV body where slide-out chamber 104 and 106 of FIG. 1 can be divided into multiple rooms. As illustrated in FIG. 7, for structure rigidity considerations, slide-out chamber 104 will have two partitioning walls 700 and 702 with space in between with enough clearance for the slide-out chamber 106 having a single partitioning wall 704. The partitioning wall 704 may have entry door 706 to facilitate access between rooms. When the slide-out 104 and 106 are in the retracted mode, the sing partitioning wall 704 of slide-out chamber 106 slides in between partitioning wall 700 and 702 of slide-out chamber 104. It will be appreciated that the arrangement of double partitioning wall in slide-out chamber 104 and single partitioning wall in slide-out chamber 106 illustrated herein is simply illustrative of one of a number of possible arrangements and that a number of variations of these arrangements can be made without departing from the spirit of the present invention.

Although the present invention has been described with reference to specific embodiments, these embodiments are illustrative only and not limiting. Many other applications and embodiments of the present invention will be apparent in light of this disclosure and the following claims.

The invention claimed is:

1. An expansible body structure for recreation vehicles, comprising:

an expandable nesting slide-out assembly comprising a smaller volume slide-out chamber and a larger volume slide-out chamber which snugly nest into each other, the nesting slide-out chambers having a means for mounting within a rigid body shell enclosure comprising at least two sidewalls each having a large sidewall opening for the slide-out chambers to extend through, the rigid body shell enclosure having spring loaded flaps mounted longitudinally at the top edges where the top of the sidewall openings and the roofs of the slide-out chambers meet, the nesting slide-out assembly having a means to extend the slide-out chambers from a retracted position to an extended position to provide a larger living area in the larger volume chamber, the nesting slide-out assembly having a means to retract the slide-out chambers from an extended position to a retracted position to reduce the overall width of the nesting slide-out assembly to the same width of the rigid body shell enclosure, the smaller volume slide-out chamber comprising a plurality of walls to provide an interior living space, a floor, a top opening for the installation of a rigid slanting roof unit, and a plurality of transversely mounted v-groove channels on the outside bottom surface of the floor as guides for extending and retracting of the smaller slide-out chamber the plurality of walls of the smaller slide-out chamber comprising an interior wall with an opening for egress, an exterior wall facing outside of the recreational vehicle having an opening for egress, and two sidewalls, the interior wall of the smaller slide-out chamber having a means to provide separate living spaces for the larger and smaller slide-out chambers, the larger slide-out chamber comprising a plurality of walls to provide an interior space with one side opening for nesting with the smaller volume slide-out chamber, having an exterior wall facing outside of the recreational vehicle with an opening for egress, two sidewalls, a floor and a top opening for the installation of a rigid slanting roof unit, and a plurality of transversely mounted v-groove channels on the outside bottom surface of the floor as guides for extending and retracting of the larger slide-out chamber, the larger slide-out chamber having a raised platform comprising a larger surface area mounted on top of a base having a smaller footprint compared to the larger surface area, the raised platform is installed on the floor of the larger slide-out chamber at the base of the exterior wall, opposite to the opening nesting with the smaller volume slide-out chamber, the base of the raised platform is permanently affixed onto the floor of the larger volume chamber, the raised larger surface area of the platform having an offset from the base with a height enough to provide sufficient clearance for the floor of the smaller volume slide-out chamber to tuck under when the slide-out chambers are in the retracted positions, a carriage assembly having a plurality of wheels and a plurality of supporting floor structure members having longitudinally mounted, low friction support members for supporting the rigid body shell enclosure and for reducing the sliding friction when the slide-out chambers are extended and retracted, the expansible body structure for recreational vehicles can be a part of a towable trailer, or part of a motorized recreational vehicle having a driving cab area, abutting to one set of adjacent sidewalls of the slide-out chambers, for the vehicle operator to operate the vehicle.

2. The expansible body structure of claim 1, wherein the supporting floor structure members have one side slightly raised to accommodate the floor height difference between the floor of the smaller volume slide-out chamber and the floor of the larger volume slide-out chamber.

3. The expansible body structure of claim 1, wherein the carriage support assembly has a plurality of control arms, either electrically or hydraulically or electro-mechanically operated, or a combination thereof, having a means for the control arms to extend or retract the slide-out chambers laterally relative to the carriage assembly independently of each other.

4. The expansible body structure of claim 1, wherein the carriage assembly includes low friction supporting members which provide sliding surfaces with matching V-groove tracks mating to the v-groove channels of the slide-room chambers, for the slide-out chambers to slide linearly between a retracted position and an expanded position and and to prevent one slide-out chamber from sliding at an angle to the other slide-out chamber.

5. The expansible body structure of claim 1, wherein the slide-out chambers have front sidewall cut-outs to provide direct access to a driving cab area.

6. The expansible body structure of claim 1, wherein the slide-out chambers each have a rigid slanting roof with a plurality of raised channels for uniform water run-off.

7. The expansible body structure of claim 1, wherein the spring loaded flaps prevent water from blowing back into the spacing where the top of the sidewall openings of the rigid body shell enclosure and the roofs of slide-out chambers meet during extending and retracting of the slide-out chambers.

8. The expansible body structure of claim 1, having a means for expanding the living space of the larger volume slide-out chamber and stowing the slide-out chambers for travelling by extending and retracting the smaller volume slide-out chamber, relative to the carriage assembly independently of the larger volume chamber.

9. The expansible body structure of claim 1, having a means for expanding the living space of the larger volume slide-out chamber and stowing the slide-out chambers for travelling by extending and retracting the larger volume slide-out chamber, relative to the carriage assembly independently of the smaller volume chamber.

10. The expansible body structure of claim 1, having a means for stowing the slide-out chambers for travelling by retracting, in a nesting manner, the slide-out chambers of the recreational vehicle flush with the rigid body shell enclosure sidewalls of the recreational vehicle.

11. The expansible body structure of claim 1, having a means for leaving an interior living space between the exterior wall of the larger volume slide-out chamber and the interior wall of the smaller slide-out chamber even in a retracted position, for the installation of kitchen furniture and appliances onto the raised platform of the larger volume slide-out chamber.

12. The expansible body structure of claim 1, having kitchen furniture and appliances installed on the larger surface area of the raised platform, having a means for the weight of kitchen furniture and appliances supported by the larger platform surface projecting above the smaller footprint base in cantilevered manner so that the kitchen furniture and appliances will not interfere with the floor of the smaller slide-out chamber in the retracted position.

13. The expansible body structure of claim 1, having a means for a much larger RV body with multiple rooms where the slide-out chambers and the rigid slanting roofs, are lengthened length-wise and divided into multiple rooms by adding dividing partitioning walls width-wise in the middle of the lengthened slide-out chambers interior living space, the partitioning walls being configured to support the weight of the longer roofs.

14. The expansible body structure of claim 13, having a means for avoiding mechanical interference of the partitioning walls even while in the retracted position by having one chamber with two partitioning walls forming a pocket with space in between the walls, having sufficient clearance for the single partitioning wail from the other chamber to slide into the pocket space between. the two partitioning wails in the retracted position.

15. The expansible body structure of claim 11, having a means for storing folding furniture in the spacing between the exterior wall of the larger volume slide-out chamber and the interior wall of the smaller slide-out chamber of the recreational vehicle, which can be opened for use when the slide-out chambers are extended and be folded and stored in the spacing prior to retracting the slide-out chamber.

16. The expansible body structure of claim 1, having a means for extending the slide-out chambers from the retracted position to the extended position by extending only about half the width of the slide-out chambers past the sidewall openings of the rigid body shell enclosure, using the weight of the remaining halves of the chambers resting on the low friction supporting structure members and held in place by the snug fit between the slide-out chambers, to act as counter-weight to the extended halves of the slide-out chambers.

* * * * *